United States Patent
Breard et al.

(10) Patent No.: US 9,413,590 B2
(45) Date of Patent: Aug. 9, 2016

(54) METHOD FOR MANAGEMENT OF A SECURED TRANSFER SESSION THROUGH AN ADDRESS TRANSLATION DEVICE, CORRESPONDING SERVER AND COMPUTER PROGRAM

(75) Inventors: Gael Breard, Fontenay-aux-Roses (FR); Marc Bailly, Pleumeur Bodou (FR); Didier Gorges, Montrouge (FR)

(73) Assignee: ORANGE, Paris (FR)

(*) Notice: Subject to any disclaimer, the term of this patent is extended or adjusted under 35 U.S.C. 154(b) by 1750 days.

(21) Appl. No.: 12/438,490

(22) PCT Filed: Jun. 26, 2007

(86) PCT No.: PCT/EP2007/056362
§ 371 (c)(1),
(2), (4) Date: Jan. 22, 2010

(87) PCT Pub. No.: WO2008/022829
PCT Pub. Date: Feb. 28, 2008

(65) Prior Publication Data
US 2010/0131631 A1    May 27, 2010

(30) Foreign Application Priority Data
Aug. 22, 2006 (FR) .................................. 06 07449

(51) Int. Cl.
*H04L 29/12* (2006.01)
*H04L 29/06* (2006.01)

(52) U.S. Cl.
CPC ........ *H04L 29/12528* (2013.01); *H04L 61/256* (2013.01); *H04L 61/2521* (2013.01); *H04L 61/2532* (2013.01); *H04L 61/2575* (2013.01); *H04L 61/2589* (2013.01); *H04L 63/166* (2013.01)

(58) Field of Classification Search
CPC .............. H04L 61/2575; H04L 61/256; H04L 61/2521; H04L 61/2532; H04L 61/2589
See application file for complete search history.

(56) References Cited

U.S. PATENT DOCUMENTS

| | | | | |
|---|---|---|---|---|
| 6,832,322 B1 * | 12/2004 | Boden et al. | ...... | H04L 29/12481 726/15 |
| 7,302,496 B1 * | 11/2007 | Metzger | .............. | H04L 61/2546 370/236 |
| 7,328,280 B2 * | 2/2008 | Takeda et al. | ..... | H04L 29/12066 709/220 |

(Continued)

OTHER PUBLICATIONS

J. Rosenberg et al: "Simple Traversal Underneath Network Address Translator (NAT) (STUN)", IETF Standard Working-Draft, Internet Engineering Task Force, IEFT, Ch, Jul. 11, 2006.

(Continued)

*Primary Examiner* — Patrice Winder
*Assistant Examiner* — Angela Widhalm De Rodrig
(74) *Attorney, Agent, or Firm* — David D. Brush; Westman, Champlin & Koehler, P.A.

(57) ABSTRACT

A method is provided for managing a secure session for transporting user packets through an address translation device between a client terminal and a first transport session management server. The session uses a first packet transmission address and at least one second packet transmission address different from the first address. The method includes a step of obtaining, by the first sever, the at least one second packet transmission address from the at least one second transport session management server, so that the client terminal can transfer packets to the first server by using at least the two addresses.

9 Claims, 4 Drawing Sheets

(56) References Cited

U.S. PATENT DOCUMENTS

| | | | |
|---|---|---|---|
| 7,441,270 B1 * | 10/2008 | Edwards et al. | H04L 63/029 709/206 |
| 7,457,293 B2 * | 11/2008 | Kokado | H04L 12/2854 370/392 |
| 7,483,393 B2 * | 1/2009 | Wing | H04L 29/12009 370/254 |
| 7,515,549 B2 * | 4/2009 | Wing et al. | H04L 29/12009 370/252 |
| 7,543,064 B2 * | 6/2009 | Juncker et al. | H04L 29/12009 709/227 |
| 7,643,412 B1 * | 1/2010 | Mitchell et al. | H04L 65/1066 370/401 |
| 7,787,459 B2 * | 8/2010 | Yuan et al. | 370/392 |
| 7,899,932 B2 * | 3/2011 | Takeda | H04L 29/12066 709/230 |
| 8,089,972 B2 * | 1/2012 | Terpstra et al. | H04L 67/1004 370/401 |
| 8,539,552 B1 * | 9/2013 | Grabelsky et al. | H04L 63/0892 709/225 |
| 8,713,132 B2 * | 4/2014 | Baum et al. | G06F 17/30017 709/217 |
| 8,838,771 B2 * | 9/2014 | Pote et al. | H04L 29/06027 370/352 |
| 2005/0105525 A1 | 5/2005 | Liu et al. | |
| 2005/0286538 A1 * | 12/2005 | Oberle et al. | H04L 29/06027 370/395.54 |
| 2006/0075127 A1 | 4/2006 | Juncker et al. | |
| 2006/0209794 A1 * | 9/2006 | Bae et al. | 370/352 |
| 2007/0011731 A1 * | 1/2007 | Le et al. | H04L 29/12471 726/11 |
| 2007/0019545 A1 * | 1/2007 | Alt et al. | 370/230 |
| 2007/0022289 A1 * | 1/2007 | Alt et al. | H04L 63/0272 713/168 |
| 2007/0058792 A1 * | 3/2007 | Chaudhari et al. | 379/88.17 |
| 2007/0121580 A1 * | 5/2007 | Forte et al. | 370/351 |
| 2007/0153812 A1 * | 7/2007 | Kemp | H04L 29/12509 370/401 |
| 2007/0253418 A1 * | 11/2007 | Shiri et al. | H04L 29/06027 370/392 |

OTHER PUBLICATIONS

Electronic Communications Committee (ECC): "Technical Issues of Establishing Any-to-Any 2-Way Real Time Communications Over the Internet"—ECC Report 50, May 24, 2005.

French Search Report of Counterpart Application No. 06/07449 Filed on Aug. 22, 2006.

International Search Report of Counterpart Application No. PCT/EP2007/056362 Filed on Jun. 26, 2007.

English Translation of the International Preliminary Report on Patentability of Counterpart Application No. PCT/EP2007/056362 Filed on Jun. 26, 2007.

* cited by examiner

METHOD FOR MANAGEMENT OF A SECURED TRANSFER SESSION THROUGH AN ADDRESS TRANSLATION DEVICE, CORRESPONDING SERVER AND COMPUTER PROGRAM

CROSS-REFERENCE TO RELATED APPLICATIONS

This Application is a Section 371 National Stage Application of International Application No. PCT EP2007/056362, filed Jun. 26, 2007 and published as WO 2008/022829 on Feb. 28, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of connections between local area networks and communications networks based on the IP protocol. The present disclosure pertains more particularly to the connection of networks known as <<home>> networks integrating communications means such as computers, mobile telephones, multimedia stations and the Internet in the context of sharing or exchange in peer-to-peer networks.

In home networks, multimedia apparatuses communicate with one another through network interfaces such as Wi-Fi, current power lines (CPL) or Ethernet interfaces. These apparatuses use these interfaces to communicate by means of the IP (Internet Protocol) and each apparatus of the network is assigned a local IP address.

To enable the apparatuses of the <<home>> network to reach the Internet, a device responsible for setting up a link between the local area network and the Internet mostly integrates one or more NAT (Network Address Translation) devices that enable a public IP Internet address to be "shared" among several apparatuses of the home network.

BACKGROUND OF THE DISCLOSURE 1.1 Prior Art

The rapid development of the Internet has resulted in a scarcity of IP addresses. The solution most commonly used to mitigate this problem lies in the use of NAT devices. Classically, a home router such as an STB (Set Top Box) to which the computer network of a dwelling is connected therefore integrates a NAT device.

The communications means situated behind the router within the local (home) network are in private addressing mode and do not have a priori knowledge of the device behind which they are located, especially the public address used on the Internet for their communications and the precise type of NAT used.

However, in certain exchanges, especially point-to-point exchanges between two machines, at least one of which is situated behind a NAT device, within a local network, the machine of the local area network (the <<client>> machine) may need to have knowledge of this information on connection with the exterior. Such information may be: the address and the public ports assigned by the NAT, the type of NAT (symmetrical, restricted port, etc), for example.

According to the prior art, a STUN (the name of the standardized IETF RFC 3489 protocol: "Simple Traversal of UDP over NATs") can be used to send the client of the local network the public address at which it is seen and the type of NAT device behind which it is connected, by setting up a secured packet transmission session. A session of this kind relies on session data including two IP addresses associated with the STUN server.

The STUN algorithm applied by the client comprises several tests to determine the type of NAT device. In one of these tests, the STUN client of the local network will ask the STUN server to reply to it from an IP address different from the one from which it has responded hitherto. This test is aimed at enabling the client, through interpretation of the response or non-response to this request, to know whether the NAT device to which it is connected is blocking a packet that comes from an IP address with which it has never communicated.

In the current state of the prior art techniques, a STUN server, in order to be capable of responding to this kind of request, must possess two different IP addresses. Thus, when a client $C_{STUN}$ wishes to address a server $STUN_A$, it starts by first of all setting up a TLS/TCP connection (encrypted connection) and sends a request SHARED-SECRET-REQUEST on this connection for exchanging a shared secret. The server $STUN_A$ responds by a SHARED-SECRET-RESPONSE message with a user name and a password as attributes.

All the following requests, sent according to the UDP ("User Datagram Protocol") comprise a field recalling the user name and another message integrity field which constitutes a signature of the message by means of the preliminarily exchanged password. Such an approach ensures that all the following requests have truly been exchanged with the same server (the communications session is therefore secured).

Upon reception of any STUN request of a <<Binding-Request>> type, a STUN server must announce its other address (CHANGED-ADDRESS attribute) from which it is capable of responding if the client $C_{STUN}$ asks it to respond from a different address (cf. §11.2.3 of the RFC 3489 STUN standard).

2. Drawbacks of the Prior Art

One problem related to this standard arises in the context of deployments on P2P (peer-to-peer) type distributed networks. In such an architecture, it is sought to reduce the number of functions hosted in centralized servers to the utmost extent. On this basis, the hosting of these functions has to be integrated into P2P network clients. Now such clients generally have only one public IP address.

According to the prior-art techniques and the specifications of the STUN protocol, it is extremely difficult in the context of P2P networks to deploy STUN servers as described by the standard. Thus, the functions of the STUN servers are hosted within a central server.

Indeed, the great scarcity of IP addresses due to an extremely rapid growth of requests for assignment linked to a high growth in the number of servers on the Internet is giving rise to problems. Thus, it is becoming hard to envisage the possibility of equipping all home STUN servers with two IP addresses used solely to respond to calls from clients wishing to obtain peer-to-peer connection.

A corollary drawback of this prior-art technique is the deterioration of the scalability of peer-to-peer architectures owing to restrictions related to the STUN protocol.

SUMMARY

The solution proposed by an aspect of the disclosure makes it possible especially to overcome these drawbacks of the prior art through a method for managing a secured session for transferring user datagrams through an address translation device, between a client terminal and a first transfer session management server, said session containing a first datagram sending address and at least one second datagram sending address distinct from the first address.

According to an embodiment of the invention, such a method comprises:
  a step for obtaining at least one second datagram sending address from at least one second transfer session management server,
  so that said client terminal can transfer datagrams addressed to said first server by using at least said two addresses.

Thus, an embodiment of the invention relies on a novel and inventive approach to the management of sessions for the secured transfer of datagrams by making it possible to obtain IP addresses needed for the running of the communications session with other servers. The second address used in the communications session is therefore that of a second server, thus making it possible for the first server not to possess two addresses and therefore making it possible to cope with a lack of IP addresses.

In one particular embodiment of the invention, said method comprises the following phases:
  requesting the opening of said secured transfer session sent by said client terminal to said first server;
  the opening of said secured transfer session by said first server, initiating said step for obtaining said at least one second address;
  the maintaining of said transfer session by said first server, enabling the management of transfers from said at least one second address.

Thus, the management of the communications session comprises successive phases for setting up and maintaining the session:
  the terminal requests the first server for the opening of a session;
  the first server initiates the obtaining of the second address needed to execute the session with a second server;
  the first server maintains the session throughout the time needed, thus enabling the transfer of data coming from the second address, and therefore from the second server.

These different phases of management of such a session therefore make it possible to obtain the second address, form the communications session and use this second address for the transfer of data. Thus, there is a saving of IP addresses since the second address comes from a server other than the one with which the client terminal enters into communication.

According to one particular aspect of an embodiment of the invention, said phase for opening said session comprises the following steps:
  the transfer by said first server of said opening request to said second server;
  the generating of said transfer session by said second server;
  the transmission of at least one first piece of information representing said session for transfer to said first server, by said second server;
  the storage by said first server of said at least one piece of information representing said transfer request;
  the transfer of at least one second piece of information representing said transfer session to said client by said first server.

Thus, obtaining the second address is done by a sequencing of steps which are initiated by the first server. Indeed, this first server does not open the session but transmits the opening request to the second server. This second server therefore opens a communications session for which it transmits representative information to the first server so that they can communicate together by means of this session.

The representative information transmitted may contain either the second address or information used to obtain knowledge of this second address. The first server then stores the information representing this session and then transmits a second piece of information representing this session to the client who has requested the opening of the session. This second piece of information representing the session may either contain the address of the second server or other pieces of information used to obtain knowledge of this second address.

According to one particular embodiment, said maintaining phase comprises the following steps:
  the sending by said client terminal of a request for transferring user datagrams using said at least two addresses, to said first server;
  the transmission of said transfer request by said first server to said second server specifying a response address from said client;
  the qualification by said first server of a first configuration of communications between said client and said first server;
  the qualification by said second server of a second configuration of communications between said client and said second server, using said response address.

The client terminal having obtained a second communications address by means of the first server uses either of these addresses to communicate with the first server. The client terminal therefore sends a request to the first server, indicating either one of these addresses as a response address (the response address is the address from which it expects to receive the requested information). The first server sends the second server the requests intended for this second server.

The first server qualifies a first communications configuration with the client by which this client can communicate with the first server. In the same way, the second server qualifies a second communications configuration with the client.

According to one particular aspect of an embodiment of the invention, said transfer session comprises at least one session code taking account of at least one of the parameters of the group comprising at least:
  one piece of information representing an identifier of a user of said client terminal;
  one piece of information representing a password of a user of said client terminal;

Thus it is possible to identify an authorization of access to services rendered by servers at the end of the phase for setting up the communications session.

According to a original characteristic, said client terminal, said first server and said at least one second server comply with the STUN protocol.

Compliance with the STUN protocol ensures that the actors in the management method comply with the usual standards prevailing in the setting up of communications sessions through address translation devices.

An embodiment of the invention also pertains to a server for managing a secured session for transferring user datagrams from a client terminal, said session containing a first datagram sending address and at least one second datagram sending address distinct from said first address.

According to an embodiment of the invention, such a server comprises:
means for obtaining at least one second datagram sending address from at least one second transfer session management server;
so that said client terminal can transfer datagrams addressed to said first server by using at least said two addresses.

In one particular embodiment of the invention, said server comprises means:
for opening of said secured transfer session by said first server client terminal to said first server following a request sent by said first client terminal, initiating said means for obtaining said at least one second address;
for maintaining said transfer session by means of said first server, enabling the management of transfers coming from said at least one second address.

According to one particular feature of an embodiment of the invention, a management server of this kind complies with the STUN protocol.

In another embodiment, the invention also concerns a computer program product downloadable from a communications network and/or stored on a computer-readable medium and/or executable by a microprocessor.

According to an embodiment of the invention, in at least one embodiment, such a computer program product comprises program code instructions for the execution of the method for managing a secured session for transferring user datagrams from a client terminal as described above.

BRIEF DESCRIPTION OF THE DRAWINGS

Other features and advantages shall appear more clearly from the following description of a preferred embodiment, given by way of a simple non-exhaustive and illustrative example, and from the appended drawings, of which.

DETAILED DESCRIPTION OF ILLUSTRATIVE EMBODIMENTS

1. Reminder of the Principle of an Embodiment of the Invention

An embodiment of the invention therefore proposes to replace the use of a STUN server possessing two IP addresses by the use of STUN servers having only one IP address. Thus, an embodiment of the invention makes it possible to deploy large-scale peer-to-peer applications.

The general principle of an embodiment of the invention is based on a novel and inventive implementation of the specifications of the STUN protocol. Indeed, an embodiment of the invention does not require any modification of the existing STUN protocol. It is based on a novel implementation of this protocol. Numerous STUN servers can thus be deployed without their being obliged to possess two different IP addresses. An embodiment of the invention will therefore run counter to the techniques of the prior art which are limited to not de-localizing the functions related to the STUN server.

Here below, we present especially the case of an implementation of a STUN server according to an embodiment of the invention in a "home" type local area network connected to the Internet by means of a home router. It is clear however that the invention is not limited to this particular application but can also be implemented in many other fields, and for example in any application in which it is sought to deploy STUN servers without wishing to make these STUN servers possess several addresses and more generally whenever the characteristics listed here below are worthwhile.

It is specified that the term <<client>> must be understood here and in the rest of the description to designate an entity that draws upon the resources of another entity to execute a task. A client can take the form of an autonomous server, a group of servers or various elements distributed separately within various communications means included in the system. Thus, at a given point in time, a STUN client who requests a STUN server for a secured transmission session may also act as a STUN server for another client also asking for another secured transmission session to be set up.

2. Description of an Embodiment

Figure 1:
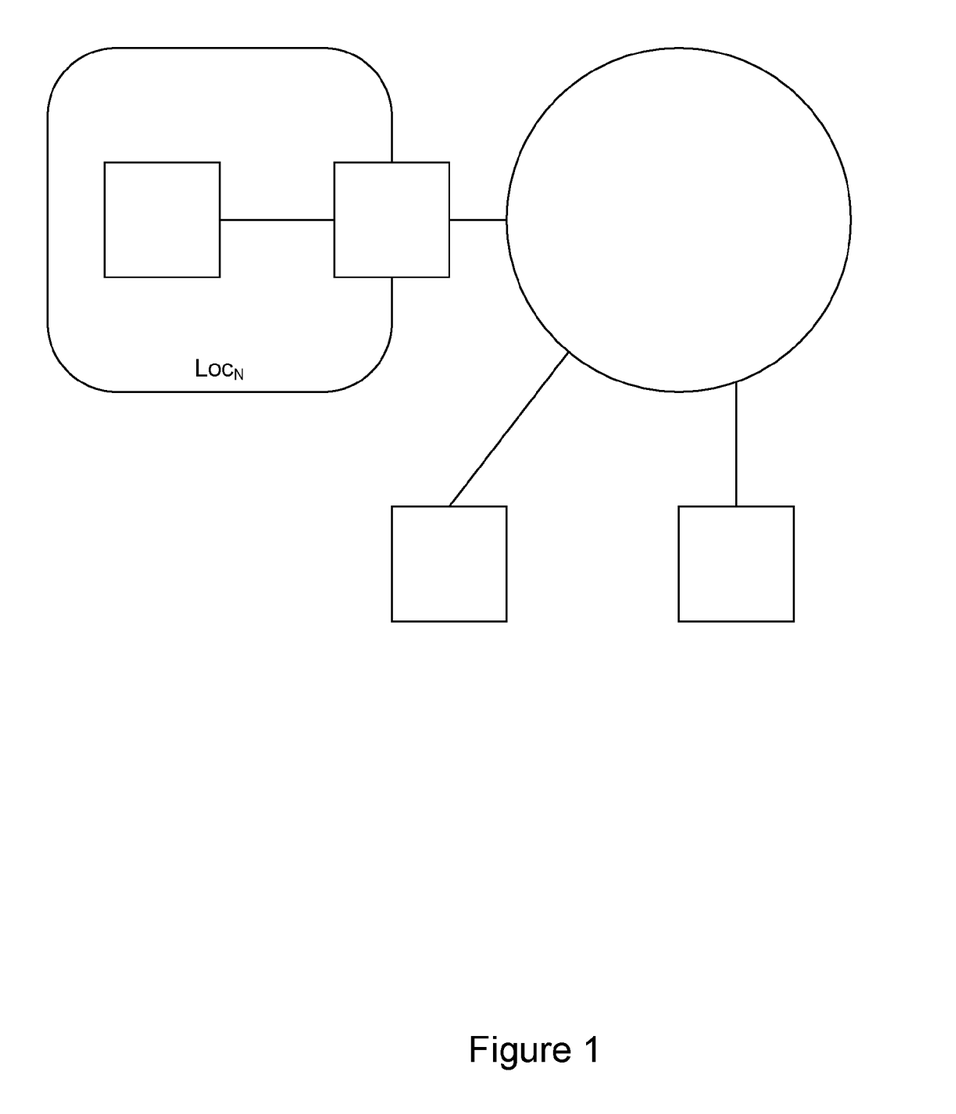
FIG. 1 shows an example of architecture of a local area network connected to the Internet and bringing two STUN servers into play.

In the description of this embodiment, referring to FIG. 1, we present the implementation of two servers $STUN_A$ and $STUN_B$. Each of these two servers has a IP address. They are situated outside the user's local area network ($Loc_N$) and are accessible through the Internet ($I_{Net}$)

A STUN client $C_{STUN}$ is situated within a local area network. It may be a personal computer, a mobile telephone or another multimedia apparatus having a network interface enabling it to get connected to this local area network. This dent $C_{STUN}$ communicates on the Internet through a NAT address translation gateway $P_{NAT}$.

The servers $STUN_A$ and $STUN_B$ are capable of managing a session for the secured transmission of user packets according to an embodiment of the invention.

In this embodiment of the invention, the proposed solution consists of the use of two mono-address STUN servers to comply with this type of request. However this is transparent from the viewpoint of the $C_{STUN}$ client which may remain standard, the session being taken charge of at the level of the $STUN_A$ server. The principle implemented in this embodiment consists in transferring any request requiring a response from a different address to a second mono-address server $STUN_B$ which takes responsibility for responding to the client.

Figure 2:
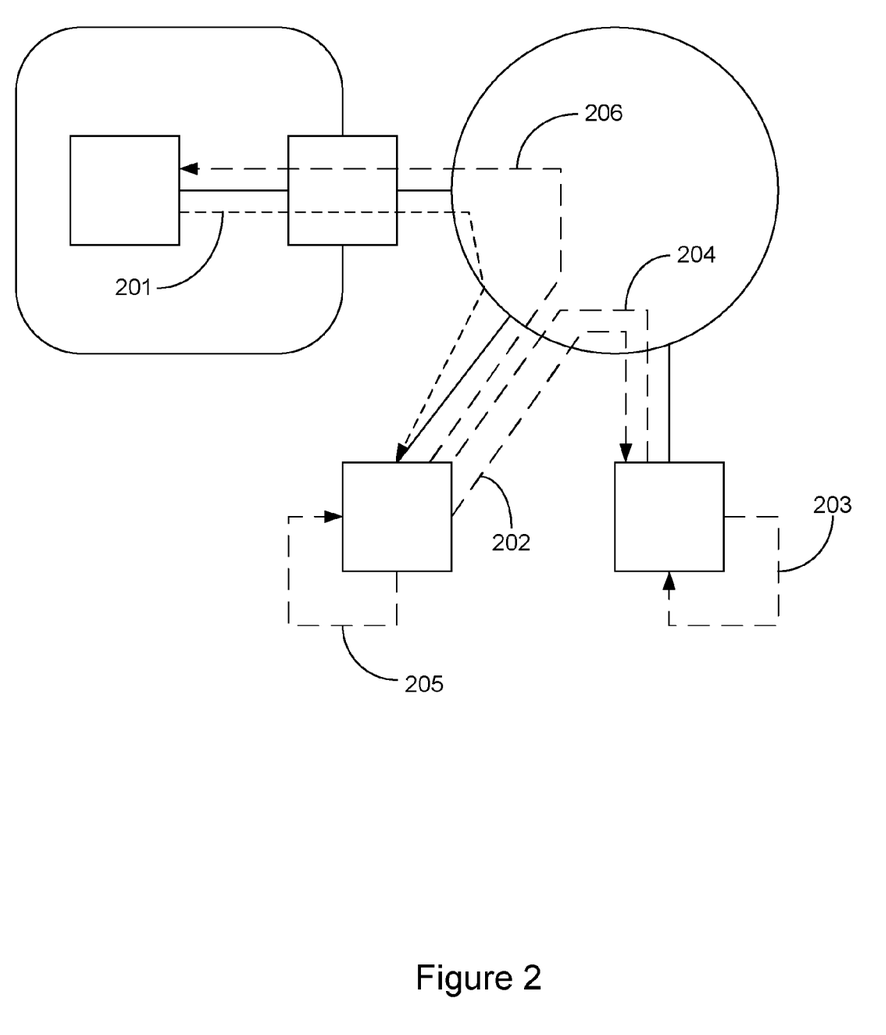
FIG. 2 presents the principle used to obtain a second packet sending address according to an embodiment of the invention in the architecture presented in FIG. 1.

Referring to FIG. 2, we present the principle used for obtaining an IP address from a second server. The client $C_{STUN}$ asks (201) the server $STUN_A$ that a session be set up. The server $STUN_A$ communicates (202) with the server $STUN_B$. This server generates (203) a session whose elements it conveys (204) to $STUN_A$ which stores (205) them and if necessary provides (206) a part of them to $C_{STUN}$.

Figure 3:
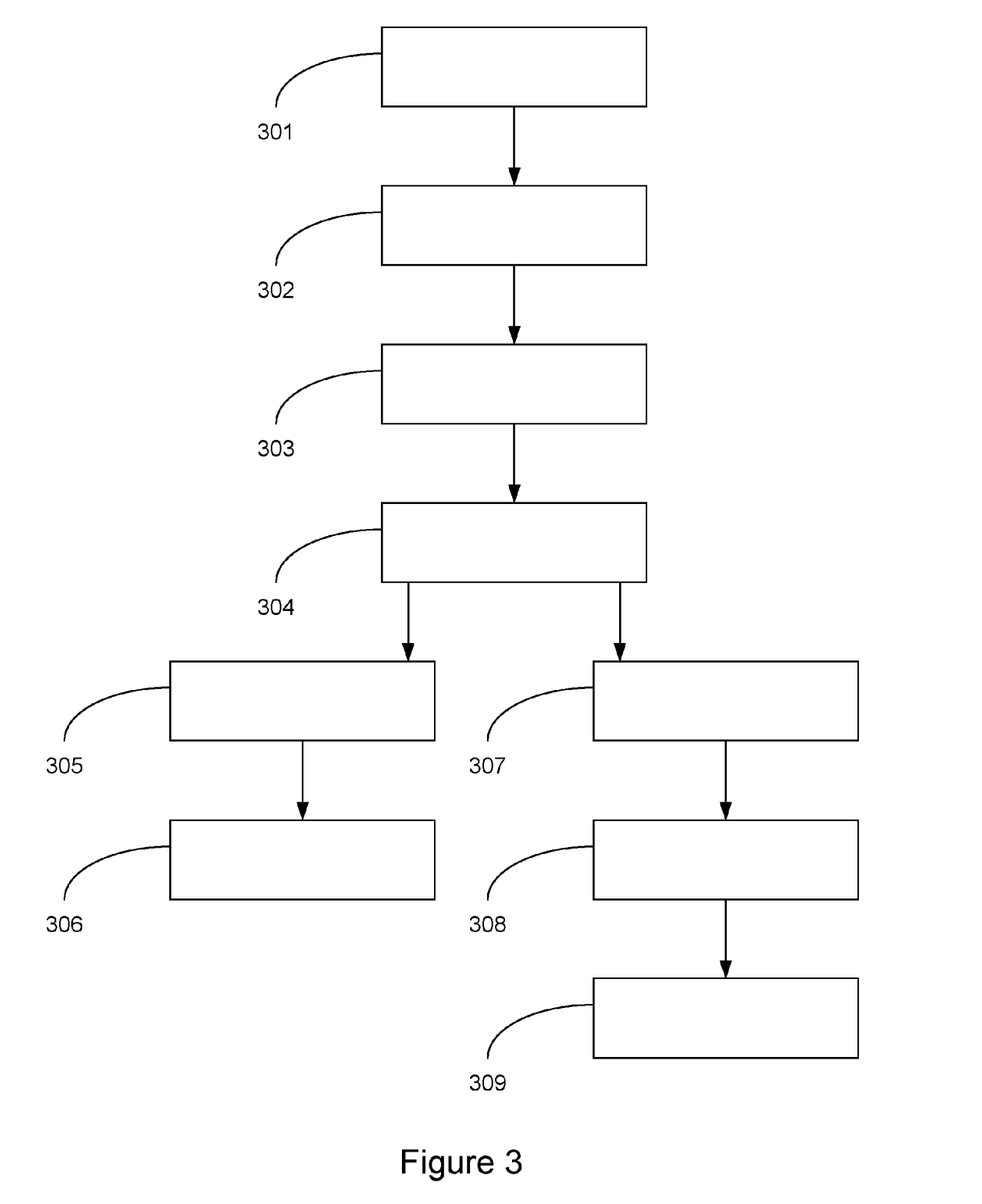
FIG. 3 illustrates the setting up of a secured communications session in using the STUN protocol in the architecture of FIG. 1.

Referring to FIG. 3, we present the sequencing of the operations leading to the setting up of a secured transmission session according to an embodiment of the invention. In a first phase of initialization:

$C_{STUN}$ asks $STUN_A$ (301) for a session code (through the elements $P_{NAT}$ and the Internet). To this end, the client $C_{STUN}$ sends a message SHARED-SECRET-REQUEST to the STUN server $STUN_A$ (in TLS, i.e. in encrypted, secured form, so that the password does not circulate in unencrypted form on the network);

STUN$_A$ relays (302) the session code request to STUN$_B$. This operation is performed by the server STUN$_A$ which sends a message SHARED-SECRET-REQUEST to the STUN server STUN$_B$;

STUN$_B$ generates (303) the access codes and sends them to STUN$_A$. To this end, the server STUN$_B$ responds to the server STUN$_A$ with a SHARED-SECRET-RESPONSE message comprising attributes comprising a user name and a password;

STUN$_A$ stores (304) the access codes (user name and password) and sends them to C$_{STUN}$ The server STUN$_A$ therefore responds to the client C$_{STUN}$ (again in TLS) in using a SHARED-SECRET-RESPONSE message comprising attributes comprising the user name and the previously stored password.

This first communications phase makes it possible to set up a secured session between a client C$_{STUN}$ and a server STUN$_A$, which is then considered by the client C$_{STUN}$ to be an authentic STUN server possessing two IP addresses. In a second communications phase, according to a first case of use that does not necessitate any communications between C$_{STUN}$ and STUN$_B$:

C$_{STUN}$ wishes to communicate (305) solely with STUN$_A$, in a secured way using its session code. The client C$_{STUN}$ (using the UDP protocol) sends a BINDING-REQUEST message to the server STUN$_A$ without the address change flag positioned (CHANGE-REQUEST);

STUN$_A$ communicates (306) with C$_{STUN}$ to qualify the configuration, in a manner secured by its session code. To this end, STUN$_A$ responds to the client with a BINDING-RESPONSE message in announcing the IP address and the STUN port of the server STUN$_B$. in the CHANGED-ADDRESS attribute.

In a second communications phase, according to a second case of use, in which the client C$_{STUN}$ wishes to obtain a response from the server on a new IP address:

C$_{STUN}$ communicates (307) with STUN$_A$ to obtain a response from STUN$_B$, in a manner secured by its session code. To this end, the client C$_{STUN}$ (using the UDP protocol) sends a BINDING-REQUEST message to the server STUN$_A$ with the address change flag positioned (CHANGE-REQUEST);

STUN$_A$ then sends (308) STUN$_B$ the context of its communications with C$_{STUN}$. Thus, the server STUN$_A$ transmits the request to STUN$_B$ in specifying the address of the client to which the must be made (RESPONSE-ADDRESS then takes the client's IP address and port);

STUN$_B$ uses (309) the session code to communicate with C$_{STUN}$ and qualify the configuration. To this end, the server STUN$_B$ (after having ascertained that the message-integrity is correct) sends the response to the client C$_{STUN}$. (This is done from its IP address which is therefore different from that of STUN$_A$).

Thus, according to an embodiment of the invention, it is possible to set up a secured session between a client C$_{STUN}$ and a server STUN$_A$ who has only one IP address while at the same time complying with the standards for exchange in the STUN protocol. From the viewpoint of the client C$_{STUN}$, everything happens as if there were only one server possessing two different IP addresses.

This embodiment is based on the sharing of secrecy between the server STUN$_A$ and the server STUN$_B$ and the generation, by this second server STUN$_B$, of the access codes needed to set up the session. Those skilled in the art will have no difficulty in understanding that this implementation enables a recursive allocation of IP addresses. Indeed, if a client asks a server to assign more than two IP addresses, the method of an embodiment of the invention is capable of providing them to him by setting up a new session between, for example, the server STUN$_B$ and another server STUN$_C$ capable of implementing the method.

Furthermore, as already indicated, the client is an entity that draws upon resources and information from another entity. Thus, it is quite possible for the servers STUN$_A$ and the server STUN$_B$ to be also STUN clients.

It is also possible to apply this principle of de-localized assignment to many fields other than that of the setting up of a session through NAT in using the STUN protocol. Indeed, those skilled in the art will have no difficulty in implementing this method for any secured communications session that necessitates the use of two different IP addresses for one and the same server.

3. Hardware Architecture of the Client and of the Server According to an Embodiment of the Invention The hardware architecture of the client is described in a very simplified manner with reference to FIG. 4. It comprises a memory 41, and a processing unit 40 equipped with a microprocessor that is driven by a computer program (or application) 42, which has the task inter alia of sending out requests for setting up communications sessions and data transfer requests.

Figure 4:
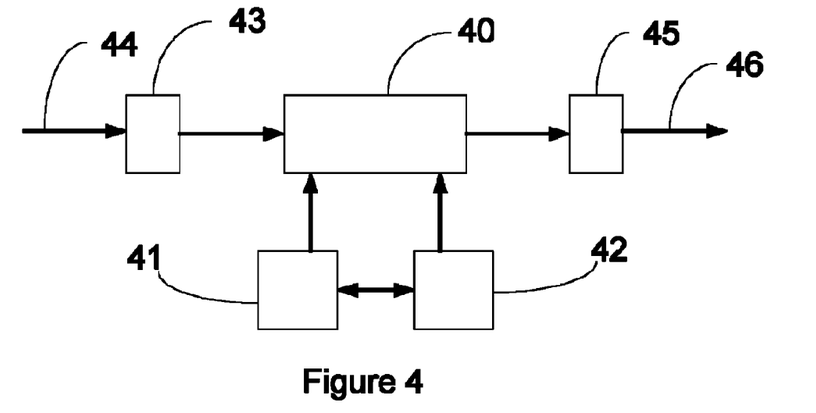
FIG. 4 presents a simplified hardware architecture of a STUN client.

At input, and through a network input interface module 43, the processing unit 40 receives responses to its requests 44 that the microprocessor processes according to the instructions of the program 42, in response to the requests for setting up communications sessions and data transfer requests 46 which are transmitted through a network output interface module 45.

Figure 5:
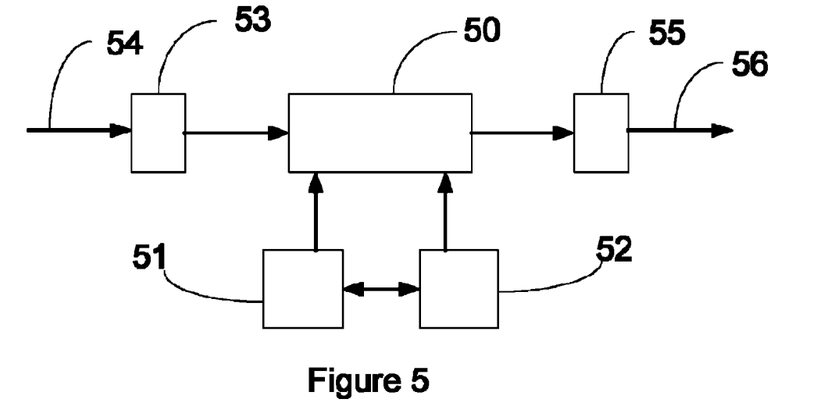
FIG. 5 presents a simplified hardware architecture of a STUN server according to an embodiment of the invention.

The hardware architecture of the server is described in a very simplified manner with reference to FIG. 5. It comprises a memory 51, and a processing unit 50 equipped with a microprocessor that is driven by a computer program (or application) 52, which has the task inter alia of sending out requests for setting up communications sessions to a second server and requests for the transfer of data, especially IP addresses.

At input, and through a network input interface module 53, the processing unit 50 receives responses to its requests 54 that the microprocessor processes according to the instructions of the program 52, in response to the requests for setting up communications sessions from a client and data transfer requests 56 which are transmitted through a network output interface module 55

Although the present disclosure has been described with reference to one or more examples, workers skilled in the art will recognize that changes may be made in form and detail without departing from the scope of the disclosure and/or the appended claims.

The invention claimed is:

1. A method of traversal of an address translation device in a network comprising:

assigning a first address to a first traversal server, assigning a second address, distinct from the first address, to a second traversal server, obtaining by said first traversal server said second address, and implementing traversal functions by using said first and second addresses, wherein implementing traversal functions comprises:

a) upon the first traversal server receiving a request for opening a communication session, performing acts of:

sending, by said first traversal server, a request for opening the communication session to said second traversal server;

generating said communication session by said second traversal server;
transmission of at least one first piece of information representing said communication session to said first traversal server, by said second traversal server;
storage by said first traversal server of said at least one piece of information representing said communication session; and
transmission of at least one second piece of information representing said communications session to a client terminal by said first traversal server, and
b) implementing a communication phase using the at least one first and second pieces of information representing said session, comprising:
receiving by said first traversal server a communication request from the client terminal requiring a response from the second address; and
transmitting by the first traversal server a communication request to said second traversal server in such a way that the second traversal server sends the response to said client terminal.

2. The method of traversal according to claim 1, wherein opening said communication session by said first server, initiates said obtaining said second address.

3. The method of traversal according to claim 1, wherein said implementing the communication phase comprises the following acts:
sending by said client terminal the communication request, which comprises a transmission request for transmission of user packets using said at least two addresses, to said first traversal server;
transmission of said transmission request by said first traversal server to said second traversal server specifying a response address from said client terminal;
qualification by said first traversal server of a first configuration of communications between said client terminal and said first traversal server;
qualification by said second traversal server of a second configuration of communications between said client terminal and said second traversal server, using said response address.

4. The method of traversal according to claim 1, wherein said communication session comprises at least one session code taking account of at least one of the parameters of the group comprising at least:
one piece of information representing an identifier of a user of the client terminal;
one piece of information representing a password of the user of the client terminal.

5. The method of traversal according to claim 1, wherein said first traversal server and said at least one second traversal server comply with a traversal protocol.

6. A first traversal server for traversal of an address translation device in a network, said network comprising:
said first traversal server to which a first address is assigned, and
a second traversal server to which a second address, distinct from said first address, is assigned,
wherein said first traversal server comprises:
a processing unit, which includes:
means for opening a communication session, where opening comprises:
sending, by said first traversal server, a request for opening the communication session to said second traversal server;
receiving at least one first piece of information representing the communication session generated by the second traversal server in response to the request for opening the communication session;
storage by said first traversal server of said at least one piece of information representing said communication session; and
transmitting at least one second piece of information representing said communications session to a client terminal by said first traversal server,
means for obtaining said second address from said second traversal server; and
means for implementing traversal functions by using said first and second addresses, which comprises:
receiving by said first traversal server a communication request from the client terminal requiring a response from the second address; and
transmitting by the first traversal server a communication request to said second traversal server in such a way that the second traversal server sends the response to said client terminal.

7. The first traversal server for traversal according to claim 6, wherein the first traversal server comprises means:
for opening the communication session by said first traversal server following a request sent by a client terminal, initiating said means for obtaining said at least one second address;
for maintaining said communication session by said first traversal server, enabling management of transmissions coming from said at least one second address.

8. The first traversal server for traversal according to claim 6, wherein the first traversal server complies with a traversal protocol.

9. A non-transitory computer-readable medium comprising a computer program product stored thereon and executable by a microprocessor, wherein the program comprises program code instructions for execution of a method of traversal of an address translation device in a network, when the program code instructions are executed by the processor, wherein the method comprises:
assigning, with the processor, a first address to a first traversal server;
assigning, with the processor, a second address, distinct from the first address, to a second traversal server;
opening a communication session, comprising:
sending, by said first traversal server, a request for opening the communication session to said second traversal server;
receiving at least one first piece of information representing the communication session generated by the second traversal server in response to the request for opening the communication session;
storage by said first traversal server of said at least one piece of information representing said communication session; and
transmission of at least one second piece of information representing said communications session to a client terminal by said first traversal server,
obtaining by said first traversal server said second address, and
implementing traversal functions by using said first and second addresses, comprising:
receiving by said first traversal server a communication request from the client terminal requiring a response from the second address; and
transmitting by the first traversal server a communication request to said second traversal server in such a way that the second traversal server sends the response to said client terminal.

* * * * *